United States Patent [19]

Huffman

[11] Patent Number: 4,499,033

[45] Date of Patent: Feb. 12, 1985

[54] CLOSELY COILED PACKING ELEMENT, METHOD OF MANUFACTURE, AND PROCESS FOR PURIFYING GASES

[76] Inventor: Lowell E. Huffman, 10 Albe Dr., Newark, Del. 19702

[21] Appl. No.: 482,838

[22] Filed: Apr. 7, 1983

Related U.S. Application Data

[63] Continuation-in-part of Ser. No. 309,602, Oct. 8, 1981, abandoned.

[51] Int. Cl.³ .............................................. B01F 3/04
[52] U.S. Cl. .......................................... 261/94; 55/69; 55/520; 29/412; 82/47; 82/1 C; 261/DIG. 72
[58] Field of Search .................... 55/520, 69; 261/DIG. 72, 94; 82/47, 1 C; 29/412

[56] References Cited

U.S. PATENT DOCUMENTS

| | | | |
|---|---|---|---|
| 437,902 | 10/1890 | Herder | 261/DIG. 72 |
| 1,654,925 | 1/1928 | Drager | 261/DIG. 72 |
| 1,848,576 | 3/1932 | Sandel | 261/DIG. 72 |
| 2,376,349 | 5/1945 | Frischer | 261/DIG. 72 |
| 2,580,703 | 1/1952 | Russell | 55/520 |
| 2,615,832 | 10/1952 | Dixon | 261/DIG. 72 |
| 3,506,248 | 4/1970 | Starbuck et al. | 261/DIG. 72 |
| 3,926,598 | 12/1975 | Filen | 55/97 |

FOREIGN PATENT DOCUMENTS

2939363 4/1981 Fed. Rep. of Germany ......... 261/DIG. 72

OTHER PUBLICATIONS

"Flexisaddles"; Bulletin FS-1; Koch Engineering Co.; 4111 E. 37th St., North Wichita, Kansas, 67208.
"Spiral Pac"; Croll-Reynolds Co.; 751 Central Ave., Westfield, N.J. 07091.
Hawley, Condensed Chem. Dictionary, 9-18-74, Van Nostram Reinhold, Co., pp. 849, 710, 432.

*Primary Examiner*—Tim Miles
*Attorney, Agent, or Firm*—Robert Jacobs

[57] ABSTRACT

A closely coiled multilayered element ("element") for use in filtration of gases, particularly with compressed air, is disclosed, which is a coiled cylindrically-shaped packing, spiralled about a common central axis where each successive layer essentially touches the previous layer. The materials of construction of the element are polyolefins, and, preferably for compressed air, polyethylene where the molecular weight may be as low as 2.5 million. The elements do not compress, thus keeping the void volume open in normal use for trapping both entrained solids and liquids, even if the liquids are dissimilar, such as oil and water. A method for manufacturing the invention which comprises cutting individual pieces of bed packing material from a solid core is also disclosed and the process of gas purification is described.

7 Claims, 5 Drawing Figures

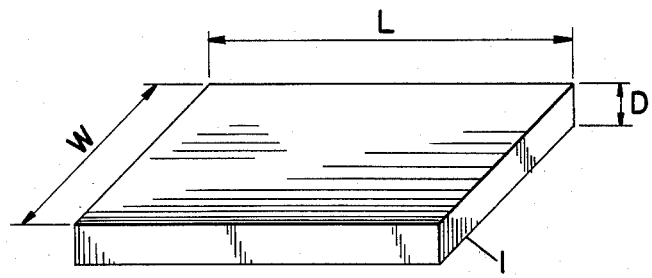
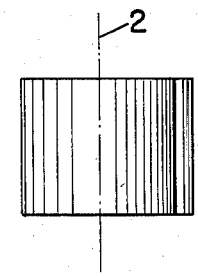
FIG. 1
FIG. 2
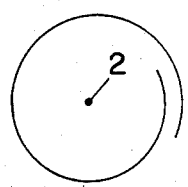
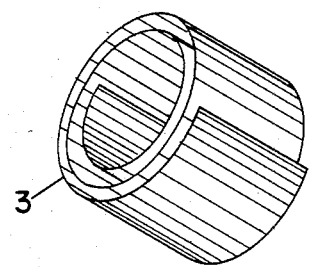
FIG. 3
FIG. 4
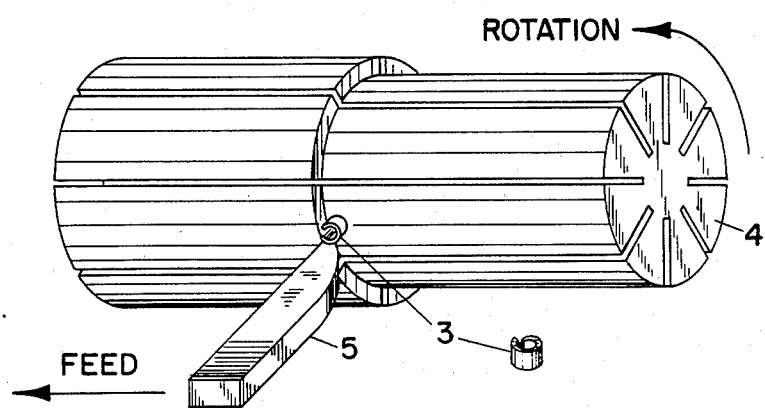
FIG. 5

CLOSELY COILED PACKING ELEMENT, METHOD OF MANUFACTURE, AND PROCESS FOR PURIFYING GASES

This is a continuation-in-part of application Ser. No. 309,602 filed Oct. 8, 1981 and now abandoned.

In the purification of gases, especially those which have been compressed, such as compressed air, particulate matter and liquids become entrained in said air or natural impurities which are in the gas or air prior to its being compressed require the gas to be freed of these impurities before use. The types of entrained materials will include: oil droplets, droplets of water, and solid particulates, such as dust, occurring in ambient air and carbon, all of which have different physical properties. The element which is utilized in a filter should be designed to remove all types of entrained materials without allowing the filtration of the materials to seriously impede the void volume for gas flow through the filter.

The invention in this application relates to a novel closely coiled multilayered element, which, because of its physical makeup and configuration, has a high void volume, thus allowing unimpeded and rapid flow of the gas through the filter mechanism; however, it has a high surface area-to-volume ratio so that material entrained in the gas stream is easily removed. Said closely coiled multilayered element will hold both water and oil, without the normal mutual exclusively of these two materials when they are present on the same surface. Said closely coiled multilayered element is free filling; a random alignment is all that is necessary for proper filling of a filter bed.

Another advantage of the invention is that the closely coiled multilayered elements ("elements") are relatively stiff and do not compress upon themselves, which would reduce the void volume and the flow of air or other gases through it.

An element is depicted on FIGS. 1 through 4. FIG. 5 is a schematic of a method of manufacturing this material. FIG. 4 is a view of a single element of this invention, item 3, as seen on an angle to show the general coiled-cylindrical configuration, the high void space within the bed packing and the closely layered effect of the element as it is spiraled around a central axis, item 2.

FIG. 1 is the single element, item 1, stretched to its full length and exhibits the three dimensions of this material: the length, L, of the uncoiled element; its width, W; and its depth, D.

FIGS. 2 and 3 are a side view and top view of a typical element.

FIG. 5 is a schematic of the method of manufacture of the elements and shows a solid core, 4, of the particular material of construction and a blade or cutting tool, 5, for cutting the solid piece to form the spiraled elements, 3. Although the drawings indicate a perfect cylinder with a flat top and a flat bottom and a perfect spiral, it is obvious that in the manufacture of the elements, the spiral might not be so uniform and one of the inner coils of the packing material might protrude beyond the outer layer. These are considered equivalent materials for the purposes of this invention. Likewise, the fact that the element may be a cube or some other tetragon of different configuration, is *not* to mean that these other shapes when spiraled will not work as efficiently and are not within the concept of this invention.

The substance used to make the element is an important consideration. The substance must be sufficiently stiff so that it will not compress, losing the all-important high-void volume. The material must be resistant to all types of gases, as well as entrained materials which are present in the gases. The material must also "remember" its closely coiled shape to allow a tight coiling of the element. The coils should be so close that they are essentially touching.

Thus, polyolefins (which in themselves are inert and are resistant to many materials) and halogenated polyolefins are considered to be the most desirable composition for the bed packing material in this application. One of the substances which has been found to be extremely useful in the filtration of compressed air, after it has gone through the compressor, is polyethylene. The polyethylene and, in fact, all of the polyolefins described should have a molecular weight greater than 2.5 million. Use of the lower molecular weight materials results in either an inability to form the coils or the formation of coils that do not retain their distinct identity and structural integrity. Polyolefins with a molecular weight of 4.5 million and greater will function properly. Only cost considerations would militate against the use of polyolefins having molecular weights of 4.5 million and above. The preferred range of molecular weight for polyethylene is 3.5 to 4 million. The preferred materials of construction are polyethylene and/or polypropylene.

Referring once again to FIG. 1, the dimension L will have a minimum length of about 0.2 inches. It will have an upper limit for utilitarian purposes of approximately 1.0 inches. The dimension W will usually be no greater than about 0.25 inches and no less than about 0.02 inches. The depth, D, will usually be no greater than 0.020 inches and no thinner than 0.001 inches. The ratio of L to W will usually range from about 8 to 1 to about 20 to 1. In addition, referring now to FIG. 3, the elements of this invention will be spiraled about a central axis, item 2, in a coiled manner, with each succeeding layer essentially touching the preceding one. As can be observed in FIG. 3, the number of parallel coiled surfaces will usually be at least 2. However, the coiled cylinder must have more than one complete spiral about the central axis. The preferred embodiment of the invention will have the L dimensions at about 0.5 inches, W at es, and D at about 0.0015. This gives the preferred ratio of L to W of 10 to 1. This preferred embodiment is especially good when the elements of this invention are used to filter compressed air. Naturally, depending on the viscosity and flow factors of other gases for which this packing can be used, such as nitrogen, oxygen, helium, hydrogen chloride and similar gases, the preferred configuration will vary, as will the preferred material of construction. The preferred material of construction indicated above for compressed gas filtration is polyethylene with a molecular weight of about 4 million. The closely coiled shape of the element is critical, since this shape and overlapping of the layers enable the packing material to spread entrapped fluids such as water and oil between the layers and thus keep them separate from the flowing gases. The fact that the closely coiled layers are essentially touching gives greater retention of entrapped materials. The surface area and the resulting high surface tension of the film which forms between the close layers prevents re-entrainment in the gas stream of the removed liquids and solids. Naturally, the flexibility of the thin coils also is important and the flexibility of the materials of construction listed above is a necessary ingredient for obtaining good elements for use in purification and filtration of compressed gases. The elements of this invention will not show any appreciable compression when supporting a column of 20 inches of elements. That is, the element, item 3, which is below 20 inches of other randomly packed elements, will retain its shape.

A method of manufacture of the elements is shown schematically in FIG. 5. There a solid cylinder of the polyolefin to be utilized, 4, is scored to within an inch or two of its central axis. The solid cylinder now scored is placed on a lathe or other rotating apparatus. A cutting tool such as a chisel, knife, or other similar type of instrument is impressed against the solid cylinder with sufficient force so that it penetrates the solid cylinder which has already been scored. Rotation then occurs causing the blade to remove a thin strip of the polyolefin material. This strip is interrupted by the prior scorings on the solid cylinder. Thus a multiple numberof hollow closely coiled cylinders, 3, which are the elements of this invention, can be manufactured from each solid cylinder. Naturally, the smaller the diameter gets on the solid cylinder, the shorter the resulting bed packing material becomes, i.e., dimension L is reduced. In order to avoid having bed packing materials which are too short and thus cannot form the minimum coiled cylinder, the core should not be scored any deeper than to allow an element material of 0.2 inches in length. A variety of length elements are formed and therefore the size of the final hollow closely coiled cylinders which are the elements of this invention will aid in maintaining a proper void space when used and is to be encouraged.

The purification process which uses the elements of this invention is started by placing the elements into an enclosure to contain them. Usually a dye that changes color as oil contacts it is sprayed on the elements or mixed with the elements prior to their being placed in a container. The container is closed with an air-tight sealer and the container has an inlet and outlet at opposite ends. Compressed gas is allowed to flow through the containers. As oil and water vapor impinge upon the closely coiled elements, the liquids migrate between the essentially touching layers of the elements and are trapped by the resultant surface tension forces. The central void of each element maintains a high void space so the gases do not flow past the entrapped liquid preferring the open path of least resistance. As the oil and water fill the space between the closely coiled layers of each element, the dye changes color allowing the user, if the container has a transparent section, to tell visually when the closely coiled elements have absorbed the maximum amount of liquids and need to be replaced. The elements are then discarded and replaced. The surface forces of the liquids between the successive layers of an element exceed the forces created by the gas flow and thus prevent re-entrainment of the liquids and entrapped particulate matter.

Having thus described my invention, I claim the following claims:

1. A closely coiled multilayer element for purifying compressed gasses of entrained solids and liquids, comprising a coiled cylinder around a central axis where each coiled multilayer element has more than one complete coil, each successive coil being sufficiently close to the previous coil to entrap solids and liquids between successive layers thereby preventing their re-entrainment into the compressed gasses wherein the closely coiled multilayer element retains its integrity when wet and when uncoiled has a solid surface with the following dimensions: Length from about 0.2 to about 1.0 inches, Width from about 0.02 to about 0.25 inches and Depth, about 0.001 to about 0.02 inches.

2. A closely coiled multilayered element according to claim 1 wherein the material of construction is a polyolefin or a halogenated polyolefin, with a molecular weight of at least 2.5 million.

3. A closely coiled multilayered element according to claim 2 wherein the polyolefin is selected from the group consisting of polyethylene, polypropylene and polybutylene.

4. A closely coiled multilayered element according to claim 3 wherein the halogenated polyolefin is fluorinated.

5. A closely coiled multilayered element according to claim 1 wherein the closely coiled multilayered element is sufficiently strong to support a column of said bed packing material which is at least twenty inches in height without appreciable compression, even when wet with the liquids it has removed from the compressed gas stream, and each successive layer is essentially touching the surface of the previous layer.

6. A method of manufacturing the closely coiled multilayered elements of claim 1 which comprises mounting a solid cylindrical piece of polyolefin or halongenated polyolefin, on a rotatable apparatus, along its central axis; cutting grooves with a sharp instrument into said solid cylindrical piece, which is parallel to the axis of the solid cylindrical piece so that the distance between grooves is from about one (1.0) inch to at least 0.2 inches in width; turning said solid cylinder about its central axis while applying a cutting instrument tangentially to the circular surface of said solid cylindrical surface at an angle and depth to shear off a piece in width and thickness to comply with the dimensional requirements of claim 1.

7. A process for purifying compressed gasses using the closely coiled multilayered elements of claim 1 which comprises filling a container which has an inlet and outlet for the flow of compressed gases with randomly packed closely coiled multilayered elements, forcing compressed gas through the filled container, allowing the liquids in said compressed gas to be trapped between the successive layers of the closely coiled multilayered elements so the surface forces retain the liquids between the successive layers, purifying the compressed gas.

* * * * *